United States Patent Office 3,446,773
Patented May 27, 1969

3,446,773
LINEAR CONDENSATION POLYMERS OF m-PHENYLENEDIAMINE AND ALDEHYDES
Eckhard Christian August Schwarz, Grifton, N.C., assignor to E. I. du Pont de Nemours and Company, Wilmington, Del., a corporation of Delaware
No Drawing. Filed Aug. 2, 1966, Ser. No. 569,580
Int. Cl. C08g 9/06
U.S. Cl. 260—47     6 Claims

ABSTRACT OF THE DISCLOSURE

High molecular weight thermoplastic resins are produced by a rapid, low-temperature condensation reaction under basic conditions between m-phenylenediamine and either formaldehyde, acetaldehyde, vanillin or 3,4-dimethoxybenzaldehyde. Examples illustrate preparation of the resins and their use in bonding polyester tire cord to rubber. The resins are useful as epoxide-curing agents in adhesive systems, as antioxidants, for casting shaped articles, and for antistatic properties.

---

This invention relates to new compositions of matter comprising high molecular-weight, synthetic thermoplastic resins, and more particularly, to linear condensation polymers of m-phenylenediamine and aldehydes.

m-Phenylenediamine/formaldehyde resins are known in the art and have been used extensively for ion-exchange purposes. The great majority of these products are cross-linked thermosetting resins. The few known linear products invariably contain nitrogen atoms as connecting links in the polymer chain and are thermally unstable.

An object of this invention is to provide new and useful thermoplastic resins. Other objects will appear hereinafter.

The objects of this invention are accomplished by a thermoplastic linear condensation polymer represented by the formula,

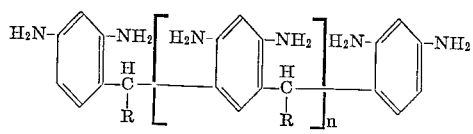

wherein R is a member selected from the group consisting of —H, —CH$_3$, and aromatic radicals of the formula

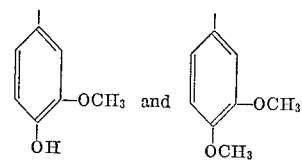

and $n$ is a whole number greater than 10.

The process for producing the new products comprises, in general, a rapid, low-temperature condensation reaction under basic conditions between m-phenylenediamine and a nearly equimolar amount of either formaldehyde, acetaldehyde, vanillin, or 3,4-dimethoxybenzaldehyde, the m-phenylenediamine being present in slight excess. Preferably the reaction medium is the basic solution formed by dissolving the m-phenylenediamine in water and cooling the solution to approximately 10° C. Slightly less than an equimolar amount of the aldehyde, either formaldehyde, acetaldehyde, vanillin, or 3,4-dimethoxybenzaldehyde is then added to the basic medium to react with the m-phenylenediamine at a relatively low temperature. The reaction is exothermic and care must be taken to prevent the heat evolved by the reaction from inducing undesirable side reactions and cross-linking. Therefore, it has been found most convenient to dissolve the m-phenylenediamine in water, cool the solution and add thereto an aqueous solution of the aldehyde. The concentration of the m-phenylenediamine/water solution and the aldehyde/water solution and the cooling temperature should be carefully selected so that upon completion of the reaction the temperature of the liquid is below approximately 60° C. In accordance with this procedure, it has been found that the concentration of the m-phenylenediamine in the diamine/water solution may be from 1% to 20%, and is preferably approximately 10 percent by weight, and the concentration of the aldehyde in the aldehyde/water solution may be from 1% to 40%, and is preferably approximately 3 percent by weight aldehyde. The temperature of the m-phenylenediamine/water solution just before addition of the aldehyde may be from —5 to +15° C. and is preferably approximately 10° C.

The products of this invention may be prepared over a wide molecular range and corresponding intrinsic viscosities. An intrinsic viscosity of at least 0.2 is generally preferred. In the form of shaped products, the polymers of this invention are transparent, slightly amber, and relatively hard at room temperature. Unlike the cross-linked products of the prior art, they are soluble in dilute acids.

The invention is further illustrated by the following examples of preferred embodiments although it is not to be restricted thereto.

Intrinsic viscosity as used in the examples which follow hereinafter is a measurement of the degree of polymerization of the particular polymer. It is measured in accordance with the procedures disclosed in U.S. Patent No. 3,068,207 at column 4, line 64 ff. with the exception that formic acid is used as the solvent for the polymer of Example I; a mixture of one part by volume formic acid and ten parts by volume m-cresol for the polymer of Example II, and 3-pentanol for the polymer of Example III.

Polymer melt temperature (PMT) as used in the examples which follow hereinafter is the temperature at which a polymer leaves a molten trail upon being rubbed across a heated metal block. As shown, the PMT values are about 50° to 160° C., depending upon the polymer.

EXAMPLE I 10.8 gm. of m-phenylenediamine and 40 ml. of water are placed in a 100-ml. beaker and the solution cooled to 10° C. The solution is rapidly stirred and 7.8 ml. of aqueous formaldehyde solution (37 weight percent formaldehyde) is quickly added. After a few seconds a precipitate forms and the temperature of the reaction mixture reaches about 55° C. The precipitate is collected and dried at 250° C. in a nitrogen atmosphere. Upon cooling, a transparent, slightly amber, glassy resin is obtained. The PMT of this resin is 160° C. and its intrinsic viscosity is 0.25. The resin is hard at room temperature. The infrared spectrum of the resin shows the aromatic rings to be tetra-substituted and shows the existance of primary amino groups in the polymer.

EXAMPLE II 25.0 gm. of m-phenylenediamine and 150 ml. of water are placed in a 500-ml. beaker and the solution cooled to 10° C. The solution is rapidly stirred and 62 ml. of an aqueous acetaldehyde solution (10 gm. acetaldehyde in 50 ml. water) is quickly added. A precipitate forms very rapidly and is collected and dried at approximately 100° C. The polymer is soluble in dilute aqueous solutions of sulfuric acid, hydrochloric acid, acetic acid, or formic acid, and can be reprecipitated from acid solution by the addition of a base such as sodium hydroxide, potassium hydroxide, or ammonium hydroxide. The product is also soluble in acetone and methanol and may be reprecipitated from solutions thereof by addition of water. The product has a PMT of 90° to 100° C. and an intrinsic viscosity of 0.25. When fused and cooled, the product is transparent, slightly amber, and hard at room temperature. Infrared analysis shows the presence of primary amino groups and the absence of free aldehyde groups in the polymer. The spectrum further shows the aromatic rings in the polymer to be tetra-substituted.

EXAMPLE III 25 gm. of m-phenylenediamine and 150 ml. of water are placed in a 500-ml. beaker and the solution cooled to 10° C. The solution is rapidly stirred and 281 ml. of an aqueous vanillin solution (34.7 gm. vanillin in 250 ml. of water) is quickly added. A latex-like precipitate forms after a few seconds which is collected and dried at 50° C. in vacuum for 2 hours. The solubility of the product is similar to the product of Example II. When fused and cooled the product is transparent, slightly amber, and relatively hard at room temperature. The PMT of this product is 95° to 105° C. and its intrinsic viscosity is 0.28.

EXAMPLE IV 25 gm. m-phenylenediamine and 150 ml. water are placed in a 500-ml. beaker. The solution is cooled to 10° C. and rapidly stirred. 236 ml. of a 3,4-dimethoxybenzaldehyde solution (37.8 gm. 3,4-dimethoxybenzaldehyde in 200 ml. of a 2:1 volume ratio of tetrahydrofuran in water) is quickly added. A precipitate forms after a few minutes which is collected and dried for 2 hours at 50° C. in vacuum. The PMT of the product is 50–60° C. and its intrinsic viscosity is 0.22. The product is soluble in the same solvents as the product of Example II. When fused and cooled the product is transparent, slightly amber, and relatively hard at room temperature. The product is shown by infrared analysis to contain primary amino groups.

EXAMPLE V

This example shows the utility of one of the compositions of this invention in the process of bonding polyester tire cord to rubber.

The example is divided into three parts; the first illustrates the synthesis of an epoxy resin; the second illustrates the synthesis of a latex and the combination of the epoxy resin with the latex and one of the m-phenylenediamine/aldehyde compounds of the present invention; the third illustrates the bonding of the polyester tire cord to rubber and shows adhesion values for the bond.

Epoxy resin synthesis 13.8 gm. of resorcinol and 15.1 gm. of vanillin are placed in a 0.5-liter flask and the mixture condensed at 250° C. for 15 minutes. The resulting resin is dissolved in a mixture of 50 ml. actone and 50 ml. epichlorohydrin. The solution is stirred and 40 gm. of $Na_2CO_3 \cdot H_2O$ is added. The stirring continues for 10 hrs. The resin is dried in vacuum at 50° C. overnight and thereafter ground in a ball mill. The infrared absorbance ratio of epoxide groups to aromatic C—H groups is approximately 2.6. (Complete epoxylation would be evidenced by a ratio of 4.0.)

Synthesis of latex composition 49.0 gm. of resorcinol is added to 98.3 gm. of distilled water at 21.1° C. When the resorcinol is completely dissolved, 26.6 gm. of formaldehyde (37 weight percent formaldehyde in water) is added and the solution aged for 1 hour. The solution is then added to 288 gm. of "Gen-Tac" (vinyl pyridine latex, trademark of General Tire and Rubber Corp.) of 41% solids concentration. The ratio of resorcinol to formaldehyde in the composition is 1.35. The composition is aged 4 days.

To 100 gm. of the resorcinol/formaldehyde/latex composition is added 54.5 gm. of water, 74.0 gm. of the epoxide dispersion (20% solids aqueous dispersion; ball-milled to fine particle-size), and 18.5 gm. of the resin of the present invention prepared in Example I (20% solids aqueous dispersion; ball-milled to fine particle-size). The final mixture, Composition "A," contains, by weight, 15% resorcinol/formaldehyde/latex, 6% epoxide resin, and 1.5% metaphenylenediamine/formaldehyde resin.

As a control, a similar resin is prepared in the following manner: To 100 gm. of the resorcinol/formaldehyde/latex composition is added 48 gm. of water and 99 gm. of the epoxide dispersion (20% solids aqueous dispersion; ball-milled to fine particle-size). No metaphenylenediamine/formaldehyde resin is added. The final mixture, Composition "B," contains, by weight, 15% resorcinol/formaldehyde/latex and 8% epoxide resin.

Bonding polyester tire cord to rubber

An 840-denier polyester yarn is twisted to 12 S turns per inch and 2 ends of this are plied and twisted to 12 Z turns per inch. Two lengths of this cord are prepared. Each length is dipped into the latex/epoxy mixtures prepared above, the first length being dipped only into Composition "A," the second only into Composition "B" in a commercial Steele machine and heated in the machine at 190.5° C. for 1 minute. The coated cords are then cured into separate unvulcanized rubber sheets and tested for adhesion. The rubber stock has the following composition:

| | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

In this process, lengths of treated cord are placed in the bottom of a steel mold, the cords being parallel with a spacing of 1 inch (2.54 cm.) between cords. The cords are placed under dead weight tension to maintain their position. A sheet of the rubber compound, 125 ml. (0.286 cm.) in thickness is placed over the cords, covered with a cotton-duck reinforcing backing, and the top of the mold placed over the backing. The mold is put into a platen press. A pressure of approximately 150 p.s.i. (10.5 kg./cm.²) is applied and the mold is heated at 140° C. for 40 minutes. After cooling, the specimen is removed from the press and ½-inch-wide (1.27-cm.) strips are cut, each strip having a cord in the center of its width. The cord end is separated from one end of the strip. The free end of the rubber strip so obtained is clamped into the upper jaw of an Instron Testing Machine and the free end of the cord in the lower jaw. The machine is then operated to separate the jaws and thereby to strip the cord from the rubber sheet in a continuous manner. The tension necessary to strip the cord from the rubber sheet is determined and reported in pounds tension for single end of cord. For determination of hot adhesion the sample is brought to a temperature of 140° C. and held there while the cord is stripped from the elastomer sheet.

Adhesion values are shown in table below.

TABLE

| Coating composition | Force necessary to strip cord from rubber sheet | |
|---|---|---|
| | At room temp. | At 140° C. |
| "A" (with metaphenylene-diamine/formaldehyde resin). | 2.0 lbs. (0.91 kg.) | 2.0 lbs. (0.91 kg.). |
| "B" (no metaphenylene-diamine/formaldehyde resin). | 1.8 lbs. (0.81 kg.) | 1.0 lb. (0.45 kg.). |

Thus, the usefulness and effectiveness of one of the new compositions of matter of the present invention is shown.

The m-phenylenediamine/aldehyde condensation products of the present invention are useful as epoxide-curing agents in adhesive systems, as antioxidants or as thermoplastic resins for casting shaped articles of specific electrical properties. Surprisingly, the new compounds are useful as antistats and may be added to polyvinylchloride to produce static-free products.

Since many different embodiments of the invention may be made without departing from the spirit and scope thereof, it is to be understood that the invention is not limited by the specific illustrations except to the extent defined in the following claims.

I claim:

1. A thermoplastic, linear condensation polymer represented by the formula,

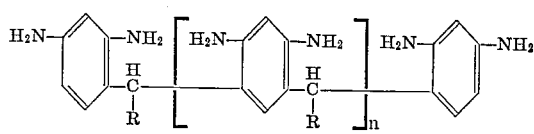

wherein R is a member selected from the group consisting of —H, —CH₃,

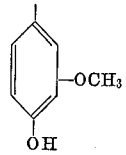

and

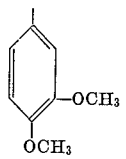

and $n$ is a whole number greater than 10.

2. A polymer as defined in claim 1 in the form of a shaped product, characterized by being transparent, slightly amber, relatively hard at room temperature, and having a polymer melting temperature of 50° to 160° C.

3. A polymer as defined in claim 1 which is a linear condensation polymer of m-phenylenediamine and formaldehyde, and has a polymer melting temperature of about 160° C.

4. A polymer as defined in claim 1 which is a linear condensation polymer of m-phenylenediamine and acetaldehyde, has a polymer melting temperature of 90° to 100° C., and is soluble in dilute aqueous solutions of sulfuric acid, hydrochloric acid, acetic acid or formic acid.

5. A polymer as defined in claim 1 which is a linear condensation polymer of m-phenylenediamine and vanillin, has a polymer melting temperature of 90° to 100° C., and is soluble in dilute aqueous solutions of sulfuric acid, hydrochloric acid, acetic acid or formic acid.

6. A polymer as defined in claim 1 which is a linear condensation polymer of m-phenylenediamine and 3,4-dimethoxy-benzaldehyde, has a polymer melting temperature of 90° to 100° C., and is soluble in dilute aqueous solutions of sulfuric acid, hydrochloric acid, acetic acid or formic acid.

References Cited

UNITED STATES PATENTS

| 2,246,526 | 6/1941 | Melof | 260—72 |
| 2,290,345 | 7/1942 | Melof | 260—72 |
| 2,582,849 | 1/1952 | Ramondt | 260—72.5 |
| 3,340,232 | 9/1967 | Smith et al. | 260—48 |
| 3,351,662 | 11/1967 | Chamot | 260—566 |

WILLIAM H. SHORT, *Primary Examiner.*

M. GOLDSTEIN, *Assistant Examiner.*

U.S. Cl. X.R.

161—184, 231; 260—29.3, 72.5, 831, 838, 846, 853